United States Patent
Nishio et al.

(10) Patent No.: US 10,766,373 B2
(45) Date of Patent: *Sep. 8, 2020

(54) POWER-FEEDING DEVICE

(71) Applicant: Panasonic Intellectual Property Management Co., Ltd., Osaka (JP)

(72) Inventors: Tsuyoshi Nishio, Chiba (JP); Osamu Ohashi, Osaka (JP); Noriaki Asaoka, Kanagawa (JP); Masayoshi Koizumi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/456,911

(22) Filed: Jun. 28, 2019

(65) Prior Publication Data
US 2019/0319497 A1  Oct. 17, 2019

Related U.S. Application Data

(63) Continuation of application No. 15/949,476, filed on Apr. 10, 2018, now Pat. No. 10,381,885, which is a
(Continued)

(30) Foreign Application Priority Data

Mar. 22, 2013 (JP) .................. 2013-060080

(51) Int. Cl.
*H02J 17/00* (2006.01)
*B60L 53/122* (2019.01)
(Continued)

(52) U.S. Cl.
CPC ............ *B60L 53/122* (2019.02); *B60L 53/38* (2019.02); *H02J 7/025* (2013.01); *H02J 50/10* (2016.02);
(Continued)

(58) Field of Classification Search
None
See application file for complete search history.

(56) References Cited

U.S. PATENT DOCUMENTS 8,110,949 B2   2/2012  Kim et al.
2002/0126089 A1  9/2002  Hamberg
(Continued)

FOREIGN PATENT DOCUMENTS

JP  2005-110409 A   4/2005
JP  2012-257381 A   12/2012
(Continued)

OTHER PUBLICATIONS

International Search Report for Application No. PCT/JP2014/001606 dated Jun. 3, 2014.
(Continued)

*Primary Examiner* — Alfonso Perez Borroto
*Assistant Examiner* — Esayas G Yeshaw
(74) *Attorney, Agent, or Firm* — Pearne & Gordon LLP

(57) ABSTRACT

To minimize excessively high output or increases in magnetic-flux leakage by controlling power feeding on the power-feeding side if an unforeseen situation occurs. This power-feeding device (100) feeds power to an external power-receiving device (150) in a contactless manner. A power-feeding coil (103) uses electromagnetic power to feed electrical power to a power-receiving coil (154) in the power-receiving device (150). While power is being fed from said power-feeding coil (103), a power-feeding-side control unit (107) determines the amount of displacement of the power-feeding coil (103) and, on the basis of the determined displacement amount, controls the amount of electrical power being fed.

7 Claims, 3 Drawing Sheets

Related U.S. Application Data continuation of application No. 14/778,425, filed as application No. PCT/JP2014/001606 on Mar. 20, 2014, now Pat. No. 9,973,040.

(51) Int. Cl.
    *H02J 50/90*     (2016.01)
    *H02J 50/10*     (2016.01)
    *H02J 50/80*     (2016.01)
    *B60L 53/38*     (2019.01)
    *H02J 7/02*     (2016.01)

(52) U.S. Cl.
    CPC .............. *H02J 50/80* (2016.02); *H02J 50/90* (2016.02); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | |
|---|---|---|---|
| 2005/0068019 A1 | 3/2005 | Nakamura et al. | |
| 2005/0201308 A1 | 9/2005 | Sekiya et al. | |
| 2007/0228833 A1* | 10/2007 | Stevens | H02J 5/005 |
| | | | 307/45 |
| 2008/0297107 A1 | 12/2008 | Kato et al. | |
| 2008/0303479 A1* | 12/2008 | Park | H02J 7/025 |
| | | | 320/108 |
| 2010/0156346 A1 | 6/2010 | Takada et al. | |
| 2010/0201204 A1* | 8/2010 | Sakoda | H02J 5/005 |
| | | | 307/104 |
| 2010/0301828 A1 | 12/2010 | Shi | |
| 2011/0196545 A1 | 8/2011 | Miwa | |
| 2011/0291489 A1 | 12/2011 | Tsai et al. | |
| 2012/0046025 A1 | 2/2012 | Das et al. | |
| 2012/0200169 A1* | 8/2012 | Urano | H02J 5/005 |
| | | | 307/104 |
| 2012/0205974 A1 | 8/2012 | McCaslin et al. | |
| 2013/0015812 A1 | 1/2013 | Boyer et al. | |
| 2013/0062961 A1 | 3/2013 | Park et al. | |
| 2013/0062963 A1 | 3/2013 | Chernokalov et al. | |
| 2013/0072115 A1 | 3/2013 | Dobyns | |
| 2013/0082653 A1 | 4/2013 | Lee et al. | |
| 2013/0094598 A1 | 4/2013 | Bastami | |
| 2013/0127253 A1* | 5/2013 | Stark | H04B 5/0037 |
| | | | 307/104 |
| 2013/0147427 A1 | 6/2013 | Polu et al. | |
| 2013/0157582 A1 | 6/2013 | Tachikawa | |
| 2013/0169057 A1 | 7/2013 | Jung et al. | |
| 2013/0178240 A1 | 7/2013 | Kiyomoto | |
| 2013/0293028 A1* | 11/2013 | Byun | H01F 38/14 |
| | | | 307/104 |
| 2014/0111023 A1 | 4/2014 | Kagami et al. | |
| 2014/0143933 A1* | 5/2014 | Low | G04C 10/00 |
| | | | 2/170 |
| 2014/0152114 A1 | 6/2014 | Kim | |
| 2014/0159651 A1 | 6/2014 | Von Novak et al. | |
| 2014/0198784 A1 | 7/2014 | Nakajima | |
| 2014/0285029 A1 | 9/2014 | Ichikawa et al. | |
| 2014/0333151 A1 | 11/2014 | Matsui et al. | |
| 2015/0207333 A1 | 7/2015 | Baarman et al. | |
| 2016/0001668 A1 | 1/2016 | Ichikawa | |
| 2016/0087691 A1 | 3/2016 | Van Wageningen et al. | |
| 2017/0179726 A1* | 6/2017 | Garrity | H02J 3/383 |
| 2017/0279315 A1* | 9/2017 | Sakata | H02J 50/80 |
| 2018/0062430 A1* | 3/2018 | Matsumoto | H02J 7/00 |

FOREIGN PATENT DOCUMENTS

| | | |
|---|---|---|
| JP | 2014-027753 A | 2/2014 |
| WO | 2010/137145 A1 | 12/2010 |
| WO | 2013-038642 A1 | 3/2013 |

OTHER PUBLICATIONS

Extended European Search Report dated Feb. 1, 2016 for European Application No. 14768899.
Communication pursuant to Article 94(3) EPC issued in Patent Application No. EP 14 768 899 dated Jan. 3, 2019.
First Office Action issued in Chinese Patent Application No. 201480016744.0 dated Apr. 21, 2017.
Notice of Reasons for Refusal issued in Japanese Patent Application No. 2013-060080 dated Mar. 10, 2017.
Second Office Action issued in Chinese Patent Application No. 201480016744.0 dated Dec. 4, 2017.

\* cited by examiner

POWER-FEEDING DEVICE

RELATED APPLICATION

This application is a continuation of U.S. patent application Ser. No. 15/949,476 filed Apr. 10, 2018, which is a continuation of U.S. patent application Ser. No. 14/778,425 filed Sep. 18, 2015, which is a national stage of PCT/JP2014/001606 filed Mar. 20, 2014, which claims priority to Japanese Patent Application 2013-060080 filed Mar. 22, 2013, the entireties of which are incorporated herein by reference.

TECHNICAL FIELD

The present invention relates to a power supply apparatus that supplies power to an external power receiving section using an electromagnetic force in a wireless manner.

BACKGROUND ART

Conventionally, wireless power supply systems have been known in which power is supplied while a power supply coil and a power receiving coil are placed facing each other in a wireless manner. In such wireless power supply systems, when vibration is added to the power supply side during power supply due to an earthquake or the like, the position of the power supply coil changes.

For example, in a wireless power supply system that supplies power to a power storage apparatus mounted on a vehicle such as an electric vehicle, a power supply apparatus is installed on the ground. In this case, when an earthquake occurs or when a large vehicle passes by, vibration occurs in the power supply apparatus and the position of the power supply coil changes. When a wireless power supply system to supply power to a portable device is mounted on a mobile unit such as a vehicle, vibration occurs and the position of the power supply coil changes as the mobile unit moves.

When the position of the power supply coil changes during power supply, coupling between the power supply coil and the power receiving coil changes, causing excessive output or an increase in magnetic flux leakage.

Conventionally, wireless power supply systems configured to stop a charging section mounted on the vehicle when an unexpected situation such as an earthquake occurs have been known (e.g., FIG. 10 in Patent Literature (hereinafter, referred to as "PTL") 1). When an unexpected situation occurs, the wireless power supply system of PTL 1 performs control of stopping power supply to a power storage apparatus by ECU. When resumption of the power supply is impossible, the power receiving side notifies the power supply side through communication that the power supply stops. Thus, the technique in PTL 1 can reduce excessive output or an increase in magnetic flux leakage associated with a change in the coupling between the power supply coil and the power receiving coil.

CITATION LIST

Patent Literature

PTL 1
WO 2010/137145

SUMMARY OF INVENTION

Technical Problem

However, according to PTL 1, since the power receiving side performs control of stopping power supply, it takes a considerable time until the power supply stops after an unexpected situation occurs. Thus, there is a problem that it is not possible to reduce excessive output or an increase in magnetic flux leakage for this time period.

An object of the present invention is to provide a power supply apparatus capable of minimizing excessive output or an increase in magnetic flux leakage by controlling power supply on the power supply side when an unexpected situation occurs.

Solution to Problem

A power supply apparatus according to the present invention supplies power to an external power receiving section in a wireless manner, the power supply apparatus including: a power supply coil that supplies power to a power receiving coil of the power receiving section using an electromagnetic force; and a control section that controls an amount of power supply based on an amount of displacement of the power supply coil when power is supplied from the power supply coil.

Advantageous Effects of Invention

According to the present invention, it is possible to minimize excessive output or an increase in magnetic flux leakage by controlling the amount of power supply on the power supply side when an unexpected situation occurs.

DESCRIPTION OF EMBODIMENT

Figure 1:
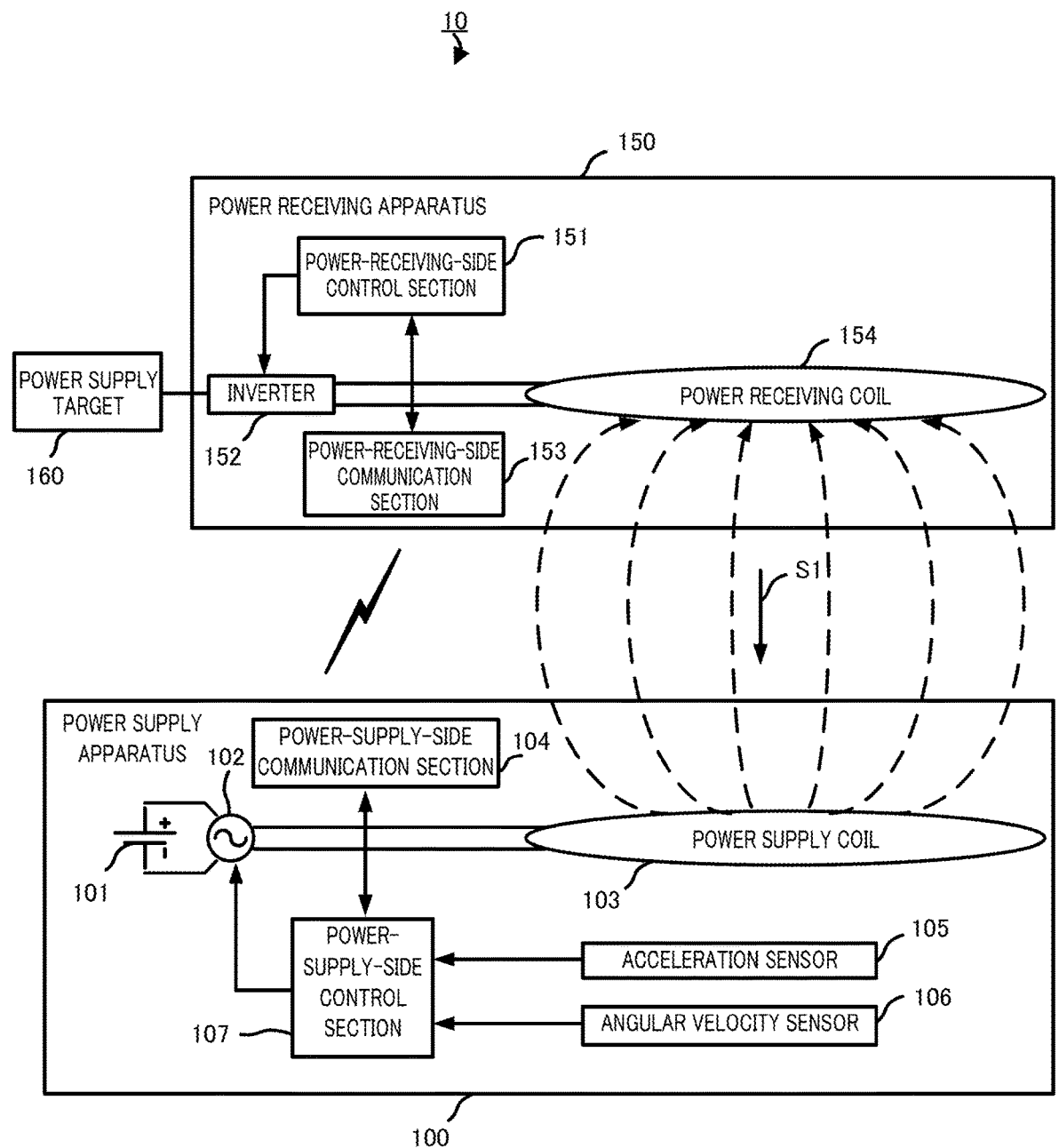
FIG. 1 is a block diagram illustrating a configuration of a power supply system according to an embodiment of the present invention.

Hereinafter, an embodiment of the present invention will be described in detail with reference to the accompanying drawings.

Embodiment

Configuration of Power Supply System

A configuration of power supply system 10 according to an embodiment of the present invention will be described using FIG. 1.

Power supply system 10 is mainly composed of power supply apparatus 100, power receiving apparatus 150 and power supply target 160.

Power supply apparatus 100 supplies power to power receiving apparatus 150.

By receiving power supply from power supply apparatus 100, power receiving apparatus 150 supplies power to power supply target 160.

Power supply target 160 is a load or battery, for example.

Power supply system 10 is used when charging in a wireless manner a battery which is mounted on a vehicle, when charging in a wireless manner a battery incorporated in an electric device such as a mobile phone or when supplying power to a load such as a motor to drive the load. When a vehicle-mounted battery is charged in a wireless manner, power supply apparatus 100 is installed on the ground such as a parking area and power receiving apparatus 150 is mounted on a vehicle.

Configuration of Power Supply Apparatus

A configuration of power supply apparatus 100 according to the embodiment of the present invention will be described using FIG. 1.

Power supply apparatus 100 is mainly composed of power supply 101, inverter 102, power supply coil 103, power-supply-side communication section 104, acceleration sensor 105, angular velocity sensor 106, and power-supply-side control section 107.

Power supply 101 supplies power to inverter 102.

Inverter 102 converts DC power supplied from power supply 101 to AC power under the control of power-supply-side control section 107 and supplies a predetermined amount of AC power to power supply coil 103. Inverter 102 changes the amount of power supplied to power supply coil 103 under the control of power-supply-side control section 107.

Upon receiving power supply from inverter 102, power supply coil 103 supplies power to power receiving coil 154. Power supply coil 103 and power receiving coil 154 are planar spiral coils, for example. Power supply coil 103 supplies power in the amount of power corresponding to the amount of power supplied from inverter 102. When supplying power, power supply coil 103 is magnetically coupled with power receiving coil 154 while facing power receiving coil 154. Power supply coil 103 supplies power to power receiving coil 154 according to, for example, an electromagnetic induction scheme or magnetic resonance scheme using an electromagnetic force.

Power-supply-side communication section 104 exchanges information relating to power supply start or power supply stop with power-receiving-side communication section 153 under the control of power-supply-side control section 107 through wireless communication. Power-supply-side communication section 104 outputs, on the basis of the exchanged information, to power-supply-side control section 107, a signal indicating that power supply is possible or a signal indicating that power supply is not possible.

Acceleration sensor 105 is installed in the periphery of power supply coil 103. Acceleration sensor 105 detects acceleration of power supply apparatus 100 and outputs the detection value to power-supply-side control section 107. By detecting the acceleration of power supply apparatus 100, acceleration sensor 105 detects acceleration of power supply coil 103. Acceleration sensor 105 is, for example, a triaxial acceleration sensor that can detect acceleration in three mutually orthogonal axial directions.

Angular velocity sensor 106 is installed in the periphery of power supply coil 103. Angular velocity sensor 106 detects an angular velocity of power supply apparatus 100 and outputs the detection value to power-supply-side control section 107. By detecting the angular velocity of power supply apparatus 100, angular velocity sensor 106 detects an angular velocity of power supply coil 103. Angular velocity sensor 106 is, for example, a triaxial angular velocity sensor that can detect angular velocities in three mutually orthogonal axial directions.

Upon receiving a signal indicating that power supply is possible from power-supply-side communication section 104, power-supply-side control section 107 controls inverter 102 so as to supply the power of power supply 101 to power supply coil 103. Upon receiving a signal indicating that power supply is not possible from power-supply-side communication section 104, power-supply-side control section 107 controls inverter 102 so as to stop the power supply from power supply 101 to power supply coil 103.

During power supply during which power is being supplied from power supply 101 to power supply coil 103, power-supply-side control section 107 accumulates detection values indicating the displacement of power supply coil 103 received from acceleration sensor 105 or angular velocity sensor 106 for a predetermined time, and thereby calculates the amount of displacement of power supply coil 103. Power-supply-side control section 107 controls inverter 102 based on the calculated amount of displacement, and thereby controls the amount of power supply.

More specifically, when the amount of displacement is equal to or greater than a threshold, power-supply-side control section 107 controls inverter 102 so that the amount of power supplied to power supply coil 103 becomes small compared to the case where the amount of displacement is smaller than the threshold. Furthermore, when the amount of displacement is equal to or greater than the threshold, power-supply-side control section 107 controls inverter 102 so as to stop power supply to power supply coil 103. Furthermore, when the amount of displacement is equal to or greater than threshold A but less than threshold B (threshold B>threshold A), power-supply-side control section 107 controls inverter 102 so that the amount of power supplied to power supply coil 103 is reduced compared to the case where the amount of displacement is less than threshold A, and power-supply-side control section 107 controls inverter 102 so as to stop the power supply to power supply coil 103 when the amount of displacement is equal to or greater than threshold B. Here, stopping power supply means reducing the amount of power supplied from power supply coil 103 to "zero".

Note that, for example, when charging system 10 is mounted on a vehicle, an acceleration sensor and an angular velocity sensor provided for a car navigation apparatus may be also used as acceleration sensor 105 and angular velocity sensor 106.

Configuration of Power Receiving Apparatus

A configuration of power receiving apparatus 150 according to the embodiment of the present invention will be described using FIG. 1.

Power receiving apparatus 150 is mainly composed of power-receiving-side control section 151, inverter 152, power-receiving-side communication section 153 and power receiving coil 154.

Upon receiving a signal indicating that power supply is possible from power-receiving-side communication section 153, power-receiving-side control section 151 controls inverter 152 so as to supply the power received by power receiving coil 154 to power supply target 160. Upon receiving a signal indicating that power supply is not possible from power-receiving-side communication section 153, power-receiving-side control section 151 controls inverter 152 so as to stop supplying the power received by power receiving coil 154 to power supply target 160.

Inverter 152 converts AC power supplied from power receiving coil 154 to DC power under the control of power-receiving-side control section 151 and supplies the DC power to power supply target 160. Note that, a rectifier using a diode, for example, may also be used to convert AC to DC instead of inverter 152.

Power-receiving-side communication section 153 exchanges information relating to power supply start or power supply stop with power-supply-side communication section 104 through wireless communication under the control of power-receiving-side control section 151. Based on the exchanged information, power-receiving-side communication section 153 outputs a signal indicating that power supply is possible or a signal indicating that power supply is not possible to power-receiving-side control section 151.

Power receiving coil 154 receives power from power supply coil 103.

Operation of Power Supply Apparatus

An operation of power supply apparatus 100 according to the embodiment of the present invention will be described using FIG. 2.

First, power supply apparatus 100 determines whether or not there is a power-supply-start instruction (step ST201).

When there is no power-supply-start instruction (step ST201: No), power supply apparatus 100 repeats the process in step ST201.

On the other hand, in power supply apparatus 100, when there is a power-supply-start instruction (step ST201: Yes), power-supply-side control section 107 determines whether or not power supply is possible by receiving a signal indicating that power supply is possible (step ST202). Upon receiving a signal indicating that power supply is possible, power-supply-side control section 107 determines that power supply is possible and upon receiving a signal indicating that power supply is not possible, power-supply-side control section 107 determines that power supply is not possible.

When power supply is not possible (step ST202: No), power supply apparatus 100 ends the process.

On the other hand, when power supply is possible (step ST202: Yes), power supply apparatus 100 sets a power supply condition (step ST203) and starts power supply (step ST204).

Next, in power supply apparatus 100, power-supply-side control section 107 determines whether or not a displacement of power supply coil 103 has been detected (step ST205). Upon receiving a detection value from acceleration sensor 105 or angular velocity sensor 106, power-supply-side control section 107 determines that a displacement has been detected. Here, the term "displacement" refers to a positional change.

In power supply apparatus 100, when no displacement of power supply coil 103 has been detected (step ST205: No), power-supply-side control section 107 determines whether or not an overcurrent or overvoltage has occurred (step ST206).

On the other hand, in power supply apparatus 100, when a displacement of power supply coil 103 has been detected (step ST205: Yes), power-supply-side control section 107 determines whether or not the amount of displacement is equal to or greater than threshold A (step ST207).

When the amount of displacement is less than threshold A (step ST207: No), power supply apparatus 100 proceeds to a process in step ST206.

On the other hand, in power supply apparatus 100, when the amount of displacement is equal to or greater than threshold A (step ST207: Yes), power-supply-side control section 107 determines whether or not the amount of displacement is equal to or greater than threshold B (threshold B>threshold A) (step ST208).

In power supply apparatus 100, when the amount of displacement is equal to or greater than threshold B (step ST208: Yes), power-supply-side control section 107 performs control so as to stop power supply from power supply coil 103 (step ST209) and ends the process.

On the other hand, in power supply apparatus 100, when the amount of displacement is less than threshold B (step ST208: No), power-supply-side control section 107 performs control so that the amount of power supply from power supply coil 103 is reduced compared to the case where the amount of displacement is equal to or greater than threshold B (step ST210), and then proceeds to step ST206.

In step ST206 when an overcurrent or overvoltage has occurred (step ST206: Yes), power supply apparatus 100 performs control so as to stop power supply from power supply coil 103 (step ST209) and ends the process.

On the other hand, when no overcurrent or overvoltage has occurred in step ST206 (step ST206: No), power supply apparatus 100 determines whether or not a power-supply-stop instruction has been received from the outside (step ST211).

When a power-supply-stop instruction has been received from the outside (step ST211: Yes), power supply apparatus 100 performs control so as to stop power supply from power supply coil 103 (step ST209), and ends the process.

On the other hand, when no power-supply-stop instruction has been received (step ST211: No), power supply apparatus 100 returns to the process in step ST205.

Figure 2:
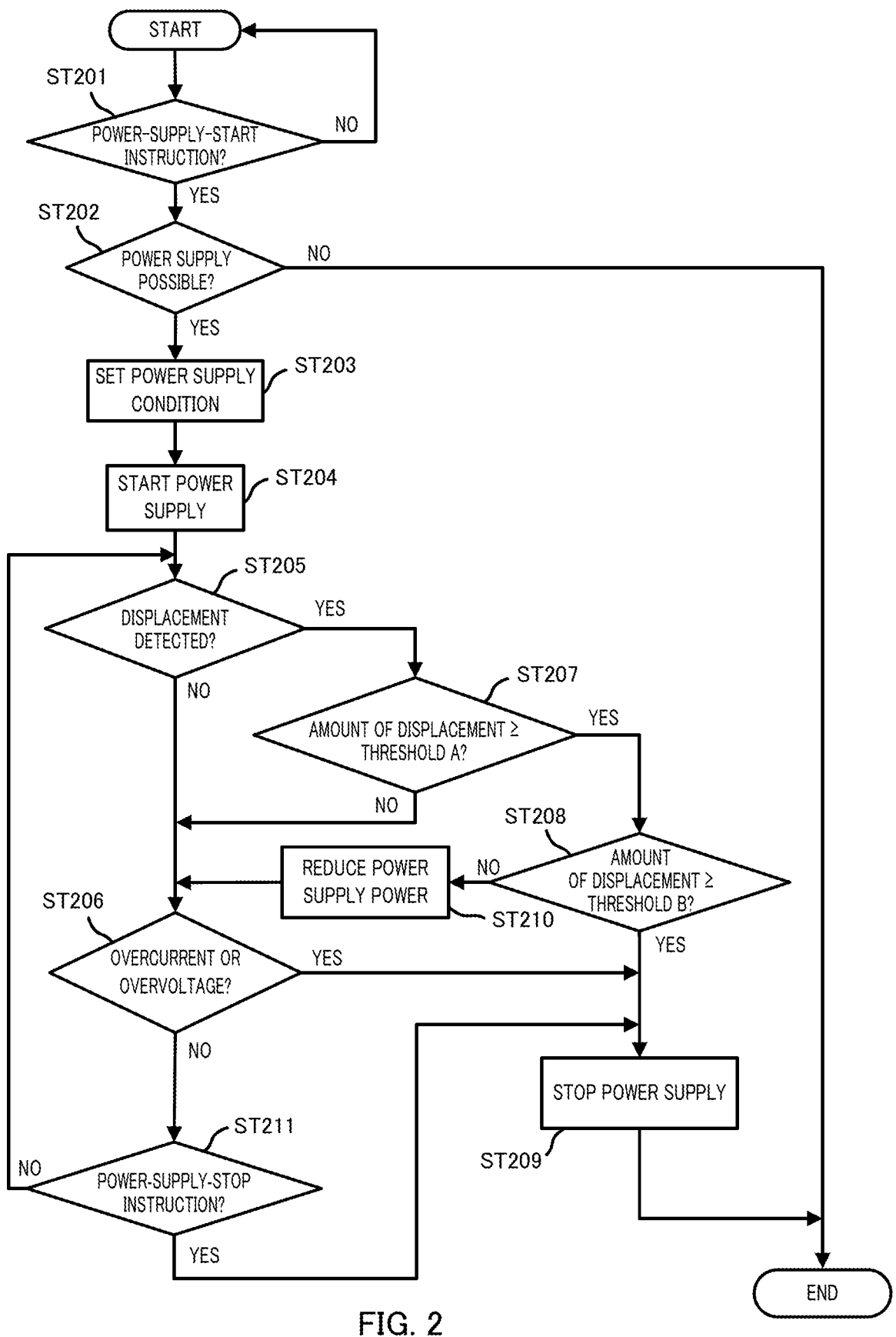
FIG. 2 is a flowchart illustrating an operation of a power supply apparatus according to an embodiment of the present invention.

Note that in FIG. 2, when the amount of displacement is equal to or greater than threshold B, the power supply is stopped to end the process, but power supply may be resumed when the amount of displacement is less than threshold B after stopping the power supply.

Arrangement of Acceleration Sensors

An arrangement of acceleration sensors 105 according to the embodiment of the present invention will be described using FIG. 3.

Figure 3:
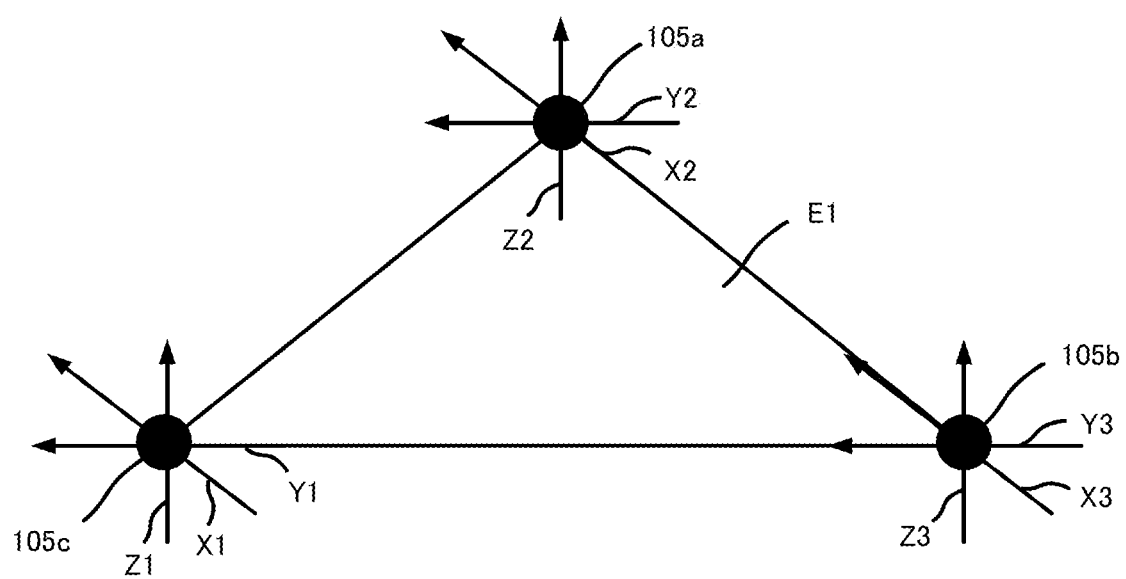
FIG. 3 is a diagram illustrating an arrangement of acceleration sensors according to the embodiment of the present invention.

FIG. 3 illustrates an arrangement of acceleration sensors 105 as seen from a direction in which power supply coil 103 and power receiving coil 154 face each other (direction shown by arrow 51 in FIG. 1).

For example, in the case where one acceleration sensor 105 detects a displacement of power supply coil 103, in a rotation around acceleration sensor 105, the position of power supply coil 103 with respect to power receiving coil 154 is shifted regardless of acceleration "zero" and the state of coupling between power supply coil 103 and power receiving coil 154 changes.

In order to solve the above problem, three acceleration sensors 105a, 105b and 105c are arranged in the manner shown in FIG. 3. That is, acceleration sensors 105a, 105b and 105c are arranged at vertices of triangle E1 respectively. Thus, power supply apparatus 100 can detect a displacement in all directions of power supply coil 103.

Note that instead of arranging three acceleration sensors 105a, 105b and 105c as shown in FIG. 3, power supply apparatus 100 can detect the displacement of power supply coil 103 in all directions using one acceleration sensor 105a capable of detecting acceleration in triaxial directions and one angular velocity sensor 106 capable of detecting angular velocities in triaxial directions.

Although three acceleration sensors 105a, 105b and 105c are arranged at vertices of triangle E1 respectively, the acceleration sensors may also be arranged at vertices of a polygon other than a triangle unless a plurality of acceleration sensors are arranged on a single straight line. The acceleration sensors are arranged at vertices of a polygon because when a plurality of acceleration sensors are arranged on a single straight line, if a displacement that rotates around this straight line as the axis of rotation occurs, it is no longer possible to detect the displacement.

Moreover, when acceleration sensor 105 is arranged as shown in FIG. 3, angular velocity sensor 106 may be omitted.

As long as displacements and rotations in triaxial directions of power supply coil 103 can be detected, any given number of acceleration sensors 105 and angular velocity sensors 106 can be arranged in any given arrangement.

When a mechanical restricting section for restricting a displacement in a specific one or multiple directions is provided separately, and a displacement in a direction in which the section for restricting the displacement thereby need not be detected, or when the influence of the displacement on the power supply is sufficiently small, the number of axes of acceleration sensors 105 and angular velocity sensor 106 may be fewer than three or one of acceleration sensor 105 and angular velocity sensor 106 may be omitted.

Threshold to be Compared with Amount of Displacement of Power Supply Coil

A threshold with which the amount of displacement of power supply coil 103 according to the embodiment of the present invention is compared will be described.

When a mechanical restricting section for restricting a displacement of power supply coil 103 is provided or a mechanical restricting section for restricting a relative displacement between power supply coil 103 and power receiving coil 154 is provided separately, it is possible to make a threshold to be compared with the amount of displacement of power supply coil 103 with respect to the direction in which the restricting section is provided greater than a threshold to be compared with the amount of displacement of power supply coil 103 with respect to another direction.

Examples of the mechanical restricting section include a member that comes into contact with power supply apparatus 100 when power supply apparatus 100 displaces to prevent further a displacement of power supply apparatus 100 or a member that restricts a relative displacement between power supply coil 103 and power receiving coil 154.

Thus, when power supply coil 103 displaces in the direction in which the restricting section is provided, or when the relative displacement between power supply coil 103 and power receiving coil 154 by provision of the restricting section is small, and in a situation in which continuation of power supply poses no problem, it is possible to prevent a reduction in the amount of power supply or the power supply from being stopped.

Effects of Present Embodiment

The present embodiment controls power supply on the power supply side when an unexpected situation occurs and can thereby minimize excessive output or an increase in magnetic flux leakage.

The present embodiment arranges the acceleration sensors at vertices of a polygon respectively, and can thereby detect a displacement of power supply coil 103 in all detections.

The present embodiment uses triaxial gyroscopes as angular velocity sensors 106, and can thereby reduce the number of sensors for detecting a displacement of power supply coil 103 and reduce the manufacturing cost.

The present embodiment reduces the amount of power supply when the amount of displacement of power supply coil 103 is equal to or greater than threshold A but less than threshold B, and can thereby reduce the frequency with which power supply is stopped compared to a case where power supply is immediately stopped.

Variations of Present Embodiment

The present embodiment reduces the amount of power supply when the amount of displacement of power supply coil 103 is equal to or greater than threshold A but less than threshold B, but the power supply may be immediately stopped when the amount of displacement of power supply coil 103 is equal to or greater than threshold A.

The present embodiment detects a displacement of power supply coil 103 using acceleration sensor 105 or angular velocity sensor 106, but any given sensor can be used if this can detect a displacement of power supply coil 103.

In the present embodiment, the installation location of the power supply apparatus is not limited to the ground but may be a mobile unit such as an automobile, railway vehicle, aircraft, ship or playground equipment. In this case, for example, the power receiving side may be a small electronic device such as a portable device.

In the present embodiment, the power supply coil and the power receiving coil are assumed to be planar spiral coils, but any coil other than the spiral coil may be used if this is a coil which can transmit and/or receive power, and a solenoid coil may be used, for example.

The disclosure of Japanese Patent Application No. 2013-060080, filed on Mar. 22, 2013, including the specification, drawings and abstract is incorporated herein by reference in its entirety.

INDUSTRIAL APPLICABILITY

The present invention is suitable for use in a power supply apparatus that supplies power to an external power receiving section using an electromagnetic force in a wireless manner.

REFERENCE SIGNS LIST

10 Power supply system
100 Power supply apparatus
101 Power supply
102 Inverter
103 Power supply coil
104 Power-supply-side communication section
105 Acceleration sensor
106 Angular velocity sensor
107 Power-supply-side control section
150 Power receiving apparatus
151 Power-receiving-side control section
152 Inverter
153 Power-receiving-side communication section
154 Power receiving coil
160 Power supply target

The invention claimed is:

1. A power supply apparatus comprising:
   a power supply coil that supplies power to a power receiving coil of a power receiving section in a wireless manner using an electromagnetic force;
   a controller that controls an amount of power supply that changes a magnetic coupling between the power supply coil and the power receiving coil based on an amount of displacement of a positional change of the power supply coil with respect to the power receiving coil when power is supplied from the power supply coil; and
   a detection section that detects the displacement of the positional change of the power supply coil,
   wherein the controller calculates the amount of displacement from an accumulation of the displacement of the positional change of the power supply coil detected by the detection section for a predetermined time, and when the amount of displacement during power supplying from the power supply coil is equal to or greater than a threshold, the controller reduces the amount of power supply to a lower amount than a case where the amount of displacement during power supplying from the power supply coil is lower than the threshold.

2. The power supply apparatus according to claim 1, wherein the controller is an acceleration sensor.

3. The power supply apparatus according to claim 1, wherein the controller is an angular velocity sensor.

4. The power supply apparatus according to claim 1, wherein the displacement of the positional change of the power supply coil occurs by an earthquake.

5. The power supply apparatus according to claim 1, wherein the power supply apparatus is installed on a ground.

6. A wireless power supply system that comprises:
   the power supply apparatus of claim 1; and
   a power receiving apparatus that comprises the power receiving section.

7. The wireless power supply system according to claim 6,
   wherein the power supply coil is mounted on a vehicle.

* * * * *